(12) United States Patent
Toffaletti

(10) Patent No.: US 9,010,788 B2
(45) Date of Patent: Apr. 21, 2015

(54) BICYCLE HANDLEBAR

(71) Applicant: John Toffaletti, Durham, NC (US)

(72) Inventor: John Toffaletti, Durham, NC (US)

( * ) Notice: Subject to any disclaimer, the term of this patent is extended or adjusted under 35 U.S.C. 154(b) by 0 days.

(21) Appl. No.: 13/623,427

(22) Filed: Sep. 20, 2012

(65) Prior Publication Data

US 2013/0069339 A1   Mar. 21, 2013

Related U.S. Application Data

(63) Continuation-in-part of application No. 13/326,756, filed on Sep. 20, 2011.

(51) Int. Cl.
*B62K 21/12* (2006.01)
(52) U.S. Cl.
CPC ...................................... *B62K 21/12* (2013.01)
(58) Field of Classification Search
CPC ........................................................ B62K 21/12
USPC ............ 74/551.1, 551.2, 551.6, 551.7, 551.8, 74/551.9; 280/261, 270, 274
See application file for complete search history.

(56) References Cited

U.S. PATENT DOCUMENTS

| | | | | |
|---|---|---|---|---|
| 4,503,729 | A | * | 3/1985 | Shimano ...................... 74/551.1 |
| 4,750,754 | A | * | 6/1988 | Lennon .......................... 280/261 |
| 5,050,444 | A | | 9/1991 | Nishimura |
| 5,224,396 | A | | 7/1993 | Lobbezoo et al. |
| 5,285,696 | A | | 2/1994 | Taylor |
| D346,145 | S | | 4/1994 | Jeshurun et al. |
| 5,390,564 | A | | 2/1995 | Klieber |
| 6,941,834 | B2 | | 9/2005 | Irie |
| 6,945,136 | B2 | | 9/2005 | Nielsen |
| 7,146,877 | B2 | | 12/2006 | You |

OTHER PUBLICATIONS

Toffaletti, John, International Application No. PCT/US2012/056295, International Search Report and Written Opinion, Nov. 30, 2012.

* cited by examiner

*Primary Examiner* — Joseph Rocca
*Assistant Examiner* — Felicia L Brittman
(74) *Attorney, Agent, or Firm* — Michael G. Johnston; Moore & Van Allen PLLC

(57) ABSTRACT

A handlebar comprises a transverse extension piece including a first gripping portion. First and second handlebar segments are disposed on opposite ends of the transverse extension piece. Each of the handlebar segments comprises an upper handlebar grip portion and a lower handlebar grip portion. The upper handlebar grip portion includes a first curved section adjoining one end of the transverse extension piece and extending forwardly and inwardly from the transverse extension piece, and a second straight section. The upper handlebar grip portion includes a second gripping portion. The lower handlebar grip portion includes a curved end portion adjoining the end of the second straight section of the upper handlebar grip portion and extends outwardly and then downwardly. The lower handlebar grip portion includes a third gripping portion. The three gripping portions of the handlebar define a plurality of gripping positions in combination with a plurality of riding positions.

23 Claims, 9 Drawing Sheets

BICYCLE HANDLEBAR

CROSS-REFERENCES

This application is a continuation-in-part application of U.S. patent application Ser. No. 13/236,756, filed Sep. 20, 2011, currently pending, the contents of which are incorporated herein by reference in the entirety.

BACKGROUND

This specification relates generally to a bicycle handlebar and, more particularly, to an ergonomic bicycle handlebar for use by a casual or recreational rider as well as a racing rider.

A conventional bicycle includes a stem coupled to the front fork of the bicycle, and a handlebar comprising a cross-bar rigidly coupled to the stem. The cross-bar is usually a tubular member and may be at least partially linear with curved portions formed at each end of the linear portion. A brake lever assembly can be mounted adjacent each end of the handlebar. The brake lever assembly comprises a grip handle bracket fixable to the handlebar and a brake lever pivotally connected to the grip handle bracket. A brake control cable connected to a corresponding brake lever assembly is introduced into the grip handle bracket for connection to the brake lever. Derailleur operating devices for changing gears, such as a shift lever, may also be located on the bicycle handlebar.

Racing bicycles are provided with a drop-type handlebar, which includes an intermediate straight portion centrally connected to a handlebar stem. A pair of U-shaped, downwardly bent drop portions are formed at both ends of the intermediate straight portion. The brake lever assemblies are mounted to the drop portions to enable the rider to conduct a braking operation while the rider grips the drop portion in a running posture.

Conventional bicycle handlebars are sometimes uncomfortable and can contribute to increased air drag forces. Moreover, the typical design for the handlebar and brake lever assembly is relatively poorly suited for an anatomically favorable posture of the hand of a rider. Selected fingers, usually the forefinger and middle finger, of the rider must be oriented to engage the brake lever and pull it rearward for a braking operation. However, this arrangement is disadvantageous for conducting a braking operation while gripping the grip handle bracket and is inherently uncomfortable for riding because the rider is required to support her weight mostly on the balls of the thumbs on the handlebar.

Riders have attached additional handlebar portions to conventional handlebars in order to increase power transfer, aerodynamics or comfort. Unfortunately, it can be difficult for the rider to control brake operating devices, derailleur operating devices, and the like when using such handlebar attachments. Moreover, the attachments do not always allow efficient power transfer from the rider to the drive train of the bicycle. Furthermore, these attachments do not always minimize air drag forces and can be uncomfortable for the rider.

For the foregoing reasons, there is a need for a bicycle handlebar with improved ergonomics. The new handlebar should be configured and oriented so as to provide the rider a comfortable riding position on the bicycle. Ideally the new handlebar will offer improved grip positions for the hands relative to the brake lever and the shift lever.

SUMMARY

A handlebar is provided for a bicycle including a stem operatively connected to a front wheel for steering the bicycle. The handlebar comprises a transverse extension piece adapted to be connected to the stem of the bicycle at a midpoint of the transverse extension piece. The transverse extension piece has a longitudinal axis and a transverse axis symmetrically bisecting the transverse extension piece and perpendicular to the longitudinal axis. The transverse extension piece includes a first gripping portion. First and second handlebar segments are disposed symmetrically on respective opposite ends of the transverse extension piece. Each of the handlebar segments comprises an upper handlebar grip portion and a lower handlebar grip portion. The upper handlebar grip portion has a longitudinal axis extending in a plane with the longitudinal axis of the transverse extension piece. The upper handlebar grip portion includes a first curved section adjoining one end of the transverse extension piece and extending forwardly and inwardly from the transverse extension piece in a direction toward the transverse axis, and a second straight section extending from the end of the curved section. The upper handlebar grip portion includes a second gripping portion. The lower handlebar grip portion has a longitudinal axis. The lower handlebar grip portion includes a curved end portion adjoining the end of the second straight section of the upper handlebar grip portion and extending outwardly along the longitudinal axis in a direction away from the transverse axis and then downwardly with respect to the plane. The lower handlebar grip portion includes a third gripping portion. The first, second and third gripping portions of the handlebar define a plurality of gripping positions for a rider in combination with a plurality of rider positions.

A bicycle is provided comprising a frame, a rear wheel rotatably mounted to the frame, a seat connected to the frame, a stem journaled to the frame forward of the seat, a fork connected to the stem, and a front wheel rotatably mounted to the fork. A handlebar comprises a transverse extension piece connected to the stem of the bicycle at a midpoint of the transverse extension piece. The transverse extension piece has a longitudinal axis and a transverse axis symmetrically bisecting the transverse extension piece and perpendicular to the longitudinal axis. The transverse extension piece includes a first gripping portion. First and second handlebar segments are disposed symmetrically on respective opposite ends of the transverse extension piece. Each of the handlebar segments comprises an upper handlebar grip portion and a lower handlebar grip portion. The upper handlebar grip portion has a longitudinal axis extending in a plane with the longitudinal axis of the transverse extension piece. The upper handlebar grip portion includes a first curved section adjoining one end of the transverse extension piece and extending forwardly and inwardly from the transverse extension piece in a direction toward the transverse axis, and a second straight section extending from the end of the curved section. The upper handlebar grip portion includes a second gripping portion. A lower handlebar grip portion has a longitudinal axis. The lower handlebar grip portion includes a curved end portion adjoining the end of the second straight section of the upper handlebar grip portion and extends outwardly along the longitudinal axis in a direction away from the transverse axis and then downwardly with respect to the plane. The lower handlebar grip portion includes a third gripping portion. The seat and the first, second and third gripping portions define a plurality of gripping positions for a rider in combination with a plurality of rider positions.

BRIEF DESCRIPTION OF THE DRAWINGS

For a more complete understanding of the present invention, reference should now be had to the embodiments shown in the accompanying drawings and described below. In the drawings.

DESCRIPTION

Certain terminology is used herein for convenience only and is not to be taken as a limitation on the invention. For example, words such as "upper," "lower," "left," "right," "horizontal," "vertical," "upward," and "downward" merely describe the configurations shown in the FIGs. Indeed, the components may be oriented in any direction and the terminology, therefore, should be understood as encompassing such variations unless specified otherwise.

Figure 1:
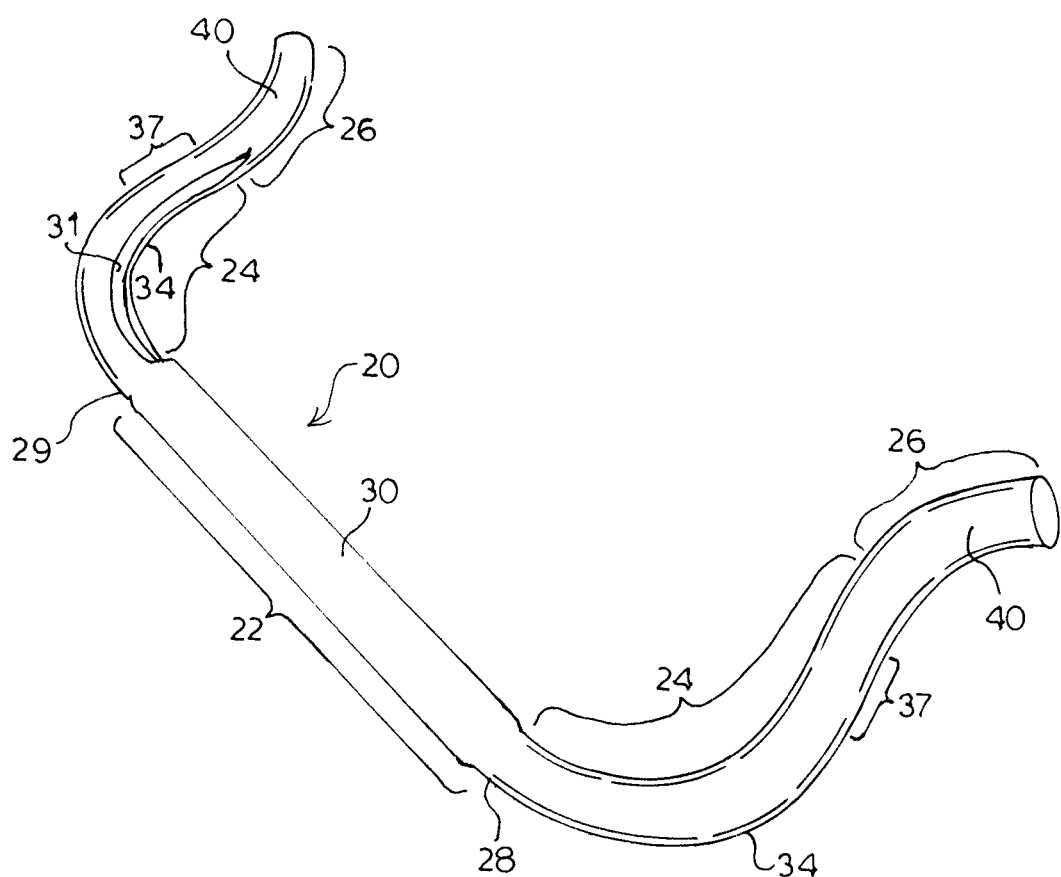
FIG. 1 is a top perspective view of an embodiment of a handlebar for use with a bicycle.
Figure 2:
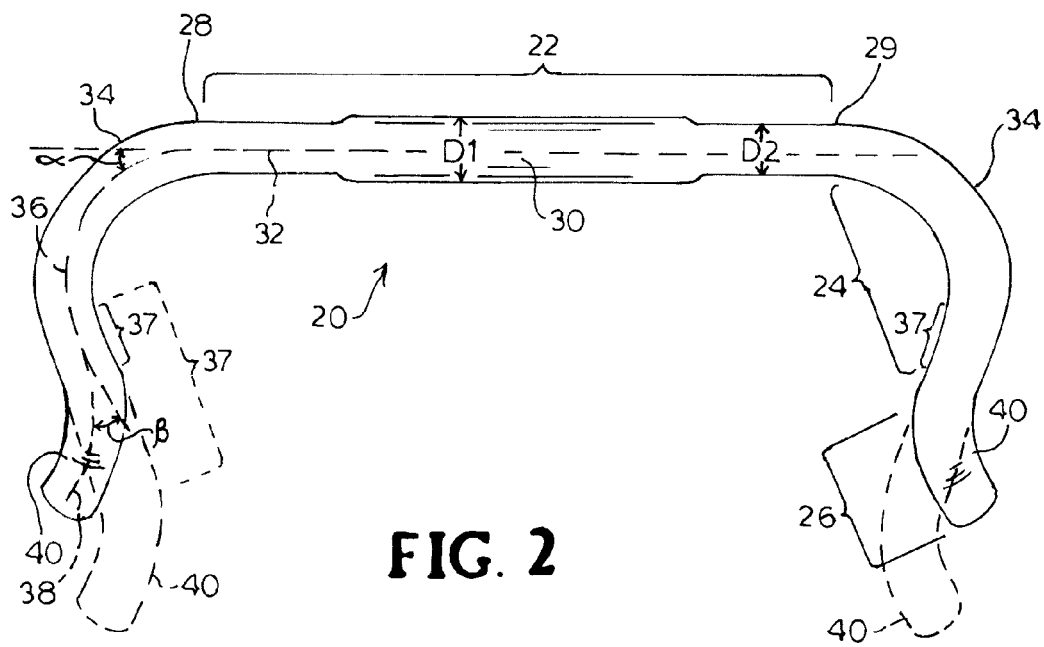
FIG. 2 is a top plan view of the handlebar as shown in FIG. 1.

Referring now to the drawings, wherein like reference numerals designate corresponding or similar elements throughout the several views, an embodiment of a handlebar for use with a bicycle is shown in FIGS. 1-7 and generally designated at 20. The handlebar 20 comprises a transverse connecting portion 22, a pair of first upper handlebar portions 24, and a pair of second lower handlebar portions 26. The transverse connecting portion 22 is a linear elongated member having first and second ends 28, 29, a short intermediate mounting section 30 and a central longitudinal axis 32 (FIG. 2). The transverse connecting portion 22 extends substantially transversely from each side of the intermediate section 30 a distance of about 7 to about 10 inches, although it is understood this distance may vary to accommodate the size of the rider. The transverse connecting portion 22 preferably has an aerodynamic cross-sectional shape. In one embodiment, the transverse connecting portion 22 is circular in transverse cross-section, and a central section of the transverse connecting portion has a clamp diameter D1 (FIG. 2). D1 may vary from about 25 mm to about 26.4 mm for standard handlebars, and up to about 32 mm for handlebars having oversized clamp diameters. The remainder of the transverse connecting portion 22 and the upper handlebar portions 24 and the lower handlebar portions 26 are substantially formed with a diameter D2. D2 is typically slightly smaller than the clamp diameter, for example, slightly less than about 25 mm. The transverse connecting portion 22 forms a first continuous gripping surface for the hands on each side of the intermediate section 30.

Figure 3:
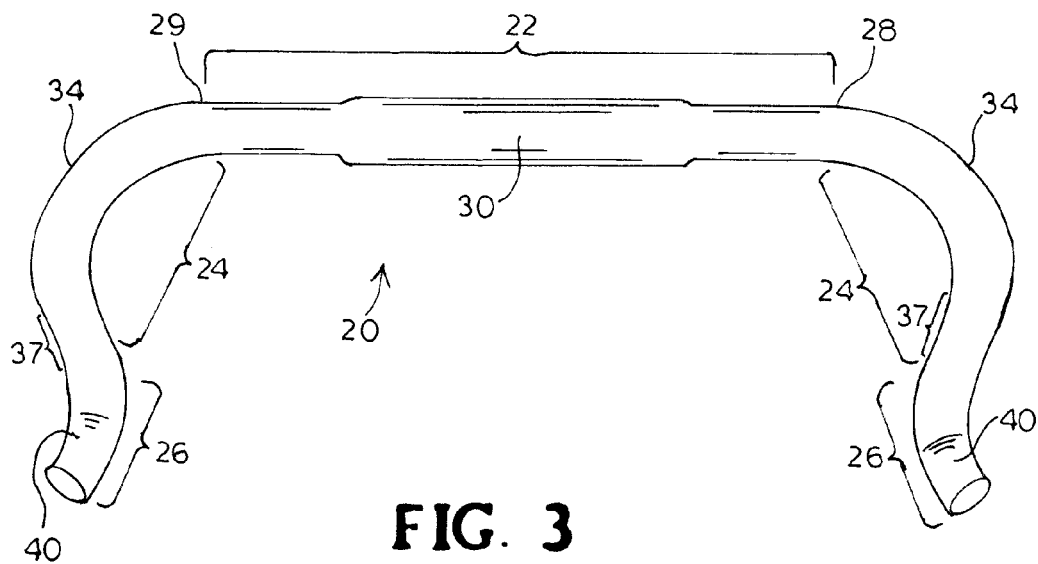
FIG. 3 is a bottom plan view of the handlebar as shown in FIG. 1.
Figure 4:
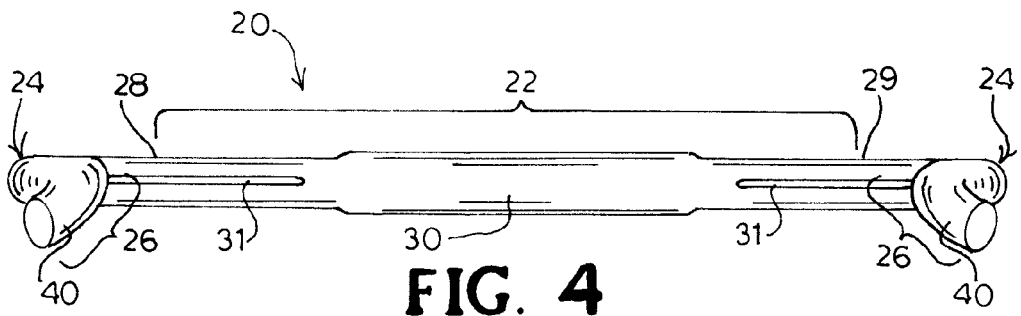
FIG. 4 is a front elevation view of the handlebar as shown in FIG. 1.
Figure 5:
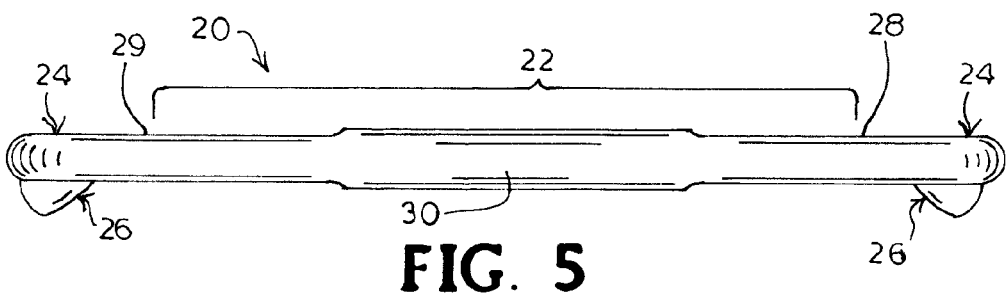
FIG. 5 is a rear elevation view of the handlebar as shown in FIG. 1.

Each of the pair of first upper handlebar portions 24 is coupled to an end 28, 29 of the transverse connecting portion 22. As best seen in FIGS. 2 and 3, the upper handlebar portions 24 extend outwardly from the ends 28, 29 of the transverse connecting portion 22. The upper handlebar portions 24 comprise a curved section 34 bending forwardly and inwardly relative to the transverse connecting portion 22. The curved section 34 is followed by a straight section 37. The curved section 34 of each upper handlebar portion 24 has a radius of curvature R1 of about one inch. Each upper handlebar portion 24 has a central longitudinal axis 36 in the same plane as the central longitudinal axis 32 of the transverse connecting portion 22. The longitudinal axes 36 at the inner end of the upper handlebar portions 24 extend tangentially to the longitudinal axis 32 of the transverse connecting portion 22. The central longitudinal axes 36 of the upper handlebar portions 24 are angled inwardly relative to the central longitudinal axis 32 of the transverse connecting portion 22. The inward angle (I) may be from about 45 degrees to about 90 degrees. The overall length of the upper handlebar portions 24 is variable, particularly with respect to the length of the straight section 37. Preferably, the upper handlebar portions 24 have an overall length sufficient to provide a second gripping surface for the hands. The second gripping surface may be used to accommodate the hands in an upright standard riding position or extended further to provide a tucked aero-position, as will be described below.

Figure 6:
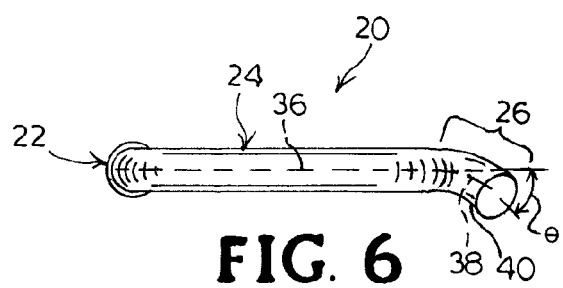
FIG. 6 is a right side elevation view of the handlebar as shown in FIG. 1, the left side view being a mirror image thereof.

Each of the pair of second lower handlebar portions 26 adjoin an end of the straight sections 37 of the first upper handlebar portions 24 in a continuing manner. The lower handlebar portions 26 curve downwardly and outwardly relative to the upper handlebar portions 24. The lower handlebar portions 26 have an outward radius of curvature R2 of about two inches, which is the curvature of drop portions of conventional drop-type handlebars and is configured to fit the grip handle brackets of brake-shift lever units. Each lower handlebar portion 26 has a central longitudinal axis 38. The longitudinal axes 38 at the inner end of the lower handlebar portions 26 extend tangentially to the longitudinal axes 36 of the upper handlebar portions 24. The longitudinal axes 38 of the lower handlebar portions 26 are angled outwardly with respect to the longitudinal axes 36 of the upper handlebar portions 24 at an angle ($\theta$) of about 10 degrees to about 40 degrees. Referring to FIG. 6, the longitudinal axes 38 of the lower handlebar portions 26 also extend tangentially to the common plane of the transverse connecting portion 22 and the upper handlebar portions 24. The longitudinal axes 38 of the lower handlebar portions 26 are angled downwardly with respect to the common plane of the transverse connecting portion 22 and the upper handlebar portions 24 at an angle ($\Pi$) of about 0 degrees to about 45 degrees. The lower handlebar portions 26 have a length along their longitudinal axis 38 sufficient for a brake-shift lever mounting section 40 to allow grip handle brackets 52 to be clamped adjacent the ends of the handlebar 20. In combination, the lower handlebar portions 26 and brake-gear shift lever units 50 form a third gripping surface for the hands.

The handlebar 20 as described herein can be constructed in a conventional manner of a one-piece, unitary member formed of lightweight metallic material, such as aluminum or titanium alloy or any other known suitable material, such as carbon fiber. In the embodiment shown in the FIGs., the handlebar 20 is formed of tubing with a crimped external groove 31 (FIG. 4) for receiving wires or cables, as needed.

Figure 7:
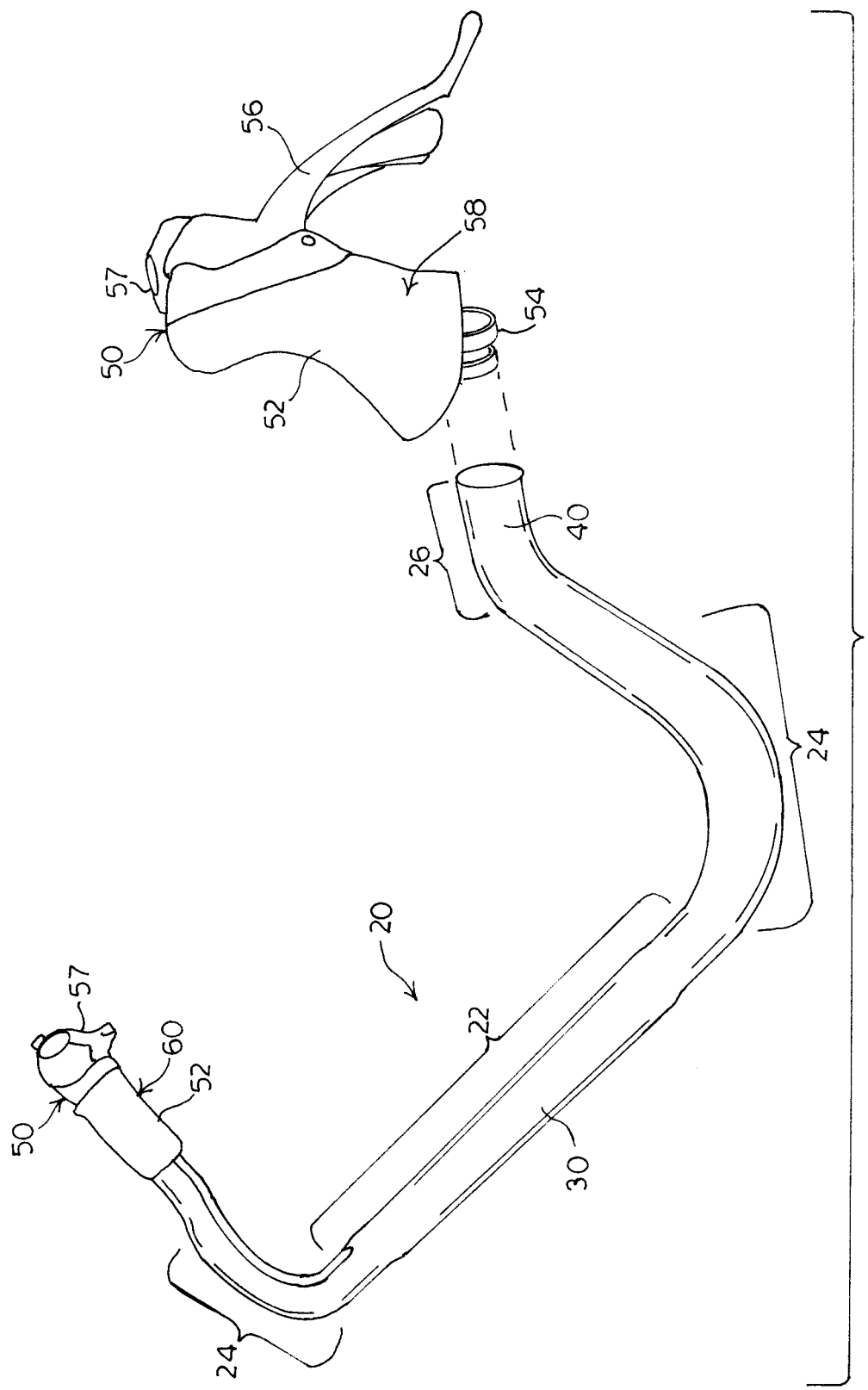
FIG. 7 is a top perspective view of the handlebar as shown in FIG. 1 with one of the brake lever assemblies exploded from the end of the handlebar.
Figure 8:
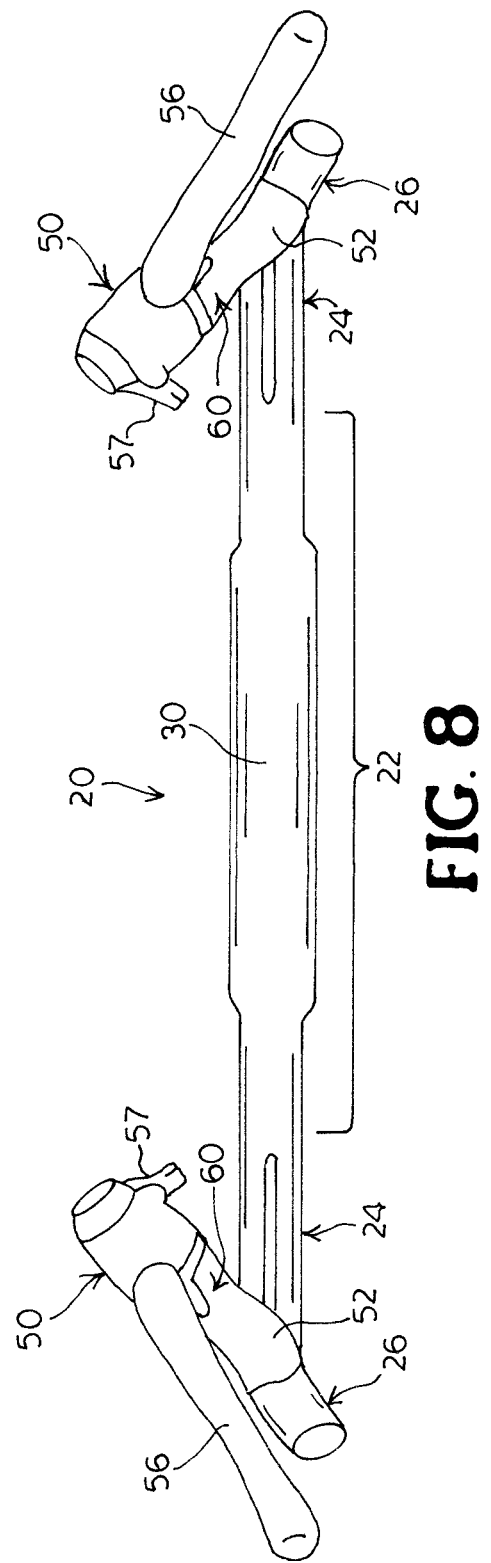
FIG. 8 is a front elevation view of the handlebar as shown in FIG. 4 including brake lever assemblies disposed on the ends of the handlebar.

The mounting sections 40 on the lower handlebar portions 26 are configured to receive standard combination brake-gear shift lever units 50. Brake-gear shift lever units 50 are well known, being available commercially from Campagnolo SRL of Vicenza, Italy, and Shimano Inc. of Osaka, Japan. Referring to FIG. 7, a typical brake-gear shift lever unit 50 comprises a grip handle bracket 52 adapted to be removably attached to the corresponding mounting section 40 of the lower handlebar portion 26 by a circular collar 54 or other suitable means. The collar 54 is split so that the ends of the collar can be compressed tightly in a gripping relation with the mounting section 40 upon tightening of a threaded element such as a screw (not shown), which is screwed into a threaded hole in the collar 54. A brake shift lever 56 is pivotally connected at one end to the grip handle bracket 52 for movement toward the handlebar 20. The brake shift lever 56 is pivotable bidirectionally laterally of the handlebar 20. More specifically, as best seen in FIG. 8, the brake shift lever 56 pivots for braking in a plane that extends through the handlebar 20 and the pivots bi-directionally in a plane that is at a right angle to the plane of movement for braking. It is understood that the structure of the combination brake-gear shift lever unit 50 is not critical to the invention and a different form of combination brake-gear shift lever unit may be used. Although not shown, it is understood that operating cables are connected to, and extend between, the brake shift levers 56 and a brake mechanism and a derailleur, respectively, for controlling the bicycle in a conventional manner. The connections between the brake-gear shift lever units 50 and the brake and derailleur are not critical, thus these connections will not be discussed or illustrated in detail herein. Rather, it will be apparent to those skilled in the art that any suitable connections could be utilized as needed.

As shown in FIG. 8, the brake-gear shift lever units 50 are mounted, in one embodiment, so that the brake shift levers 56 are located directly in front of the end of the lower handlebar portions 26. The downwardly and outwardly curved ends of the lower handlebar portions 26 are configured so that the brake-gear shift lever units, when mounted, may extend upwardly and inwardly as shown in FIG. 8. The length of the lower handlebar portions 26 can vary to allow different angles of orientation of the grip handle brackets 52. For example, a short overall length of the lower handlebar portions 26 will provide a more inwardly directed angle of the grip handle brackets 52 and a longer length of the lower handlebar portions 26 will provide a more forwardly directed angle of the grip handle brackets 52. A plane aligned along the longitudinal axis of the grip handle brackets 52 and brake shift levers 56 and passing through the central longitudinal axis 38 of the lower handlebar portions 26 extends inwardly and upwardly in an inclined fashion at an angle with respect to the common plane of the transverse connecting portion 22 and the upper handlebar portions 24 of about 0 degrees to about 45 degrees.

Figure 10:
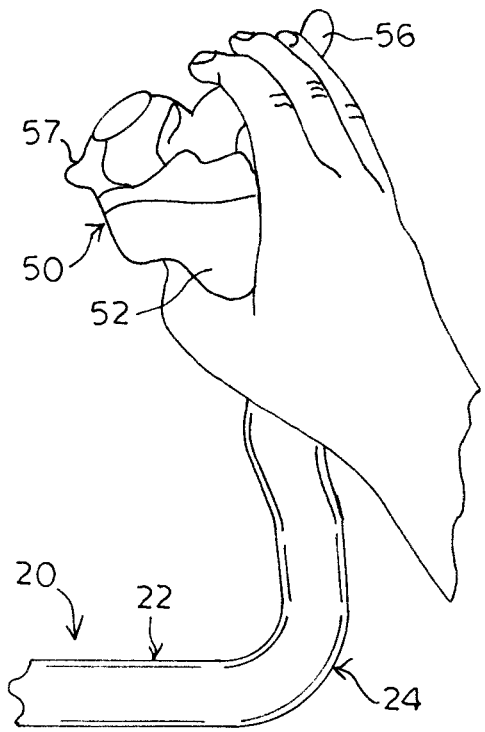
FIG. 10 is a top plan view of one side of the handlebar as shown in FIG. 8 and a hand of a user in a first position on the handlebar and the brake lever assembly.
Figure 11:
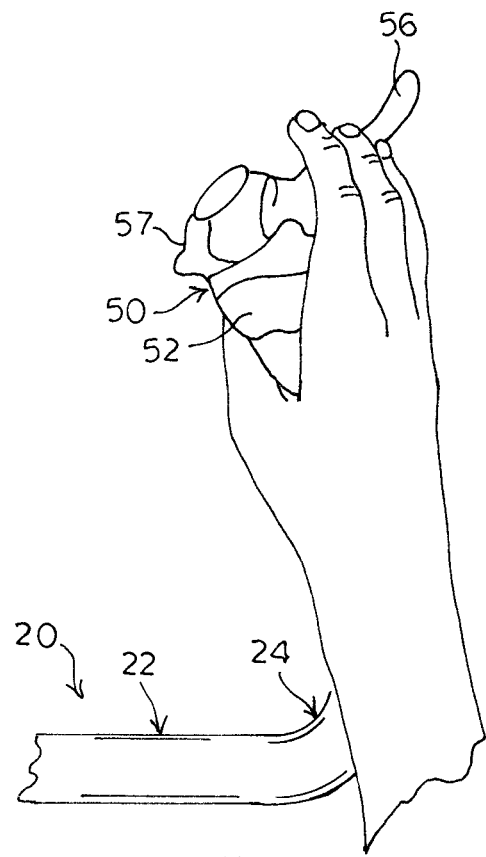
FIG. 11 is a top plan view of one side of the handlebar as shown in FIG. 10 and a hand of a user in a second position on the handlebar and the brake lever assembly.

The lower handlebar portions 26 and the brake-gear shift lever units 50 together form a gripping section. Specifically, as shown in FIGS. 10 and 11, the grip handle bracket 52 has an upper surface 58 workable as a palm rest and a lower surface 60, which may be suitably shaped to facilitate gripping by the fingers. Each grip handle bracket 52 is sufficiently elongated such that the handlebar 20 and the grip handle bracket 52 form a saddle to provide a stable support for the rider's palm. This specific arrangement, along with the inward angle of the upper handlebar portions 24, provides an ergonomic gripping position for the hands. The hands rest primarily on the upwardly facing upper surface 58 of the brake-gear shift lever units 50. The variable angle of the brake-gear shift lever units 50 relative to the vertical allows the hands to rest on different portions of the grip handle brackets 52. For example, at about 0 degrees the hands are completely on the upper surface 58 of the grip handle brackets 52. At about 45 degrees, the hands rest approximately equally on the upper surface 58 and the outer portions of the grip handle brackets 52. In addition to supporting the hands, this arrangement also provides for comfortable use of the brake shift levers 56 by the hands. As shown in FIGS. 10 and 11, when assuming either riding posture with a hand resting on the grip handle bracket 52, selected fingers, normally at least the forefinger and the middle finger, can conveniently reach and engage the brake shift lever 56 while gripping the grip handle bracket 52. The fourth and fifth fingers can conveniently reach the ends of the lower handlebar portions 26 below the grip handle brackets 52. As a result, the rider can pivotally pull the brake shift lever 56 in a natural grasping manner to operate the brake shift levers 56 without taking the hands off of the grip handle brackets 52.

Figure 9:
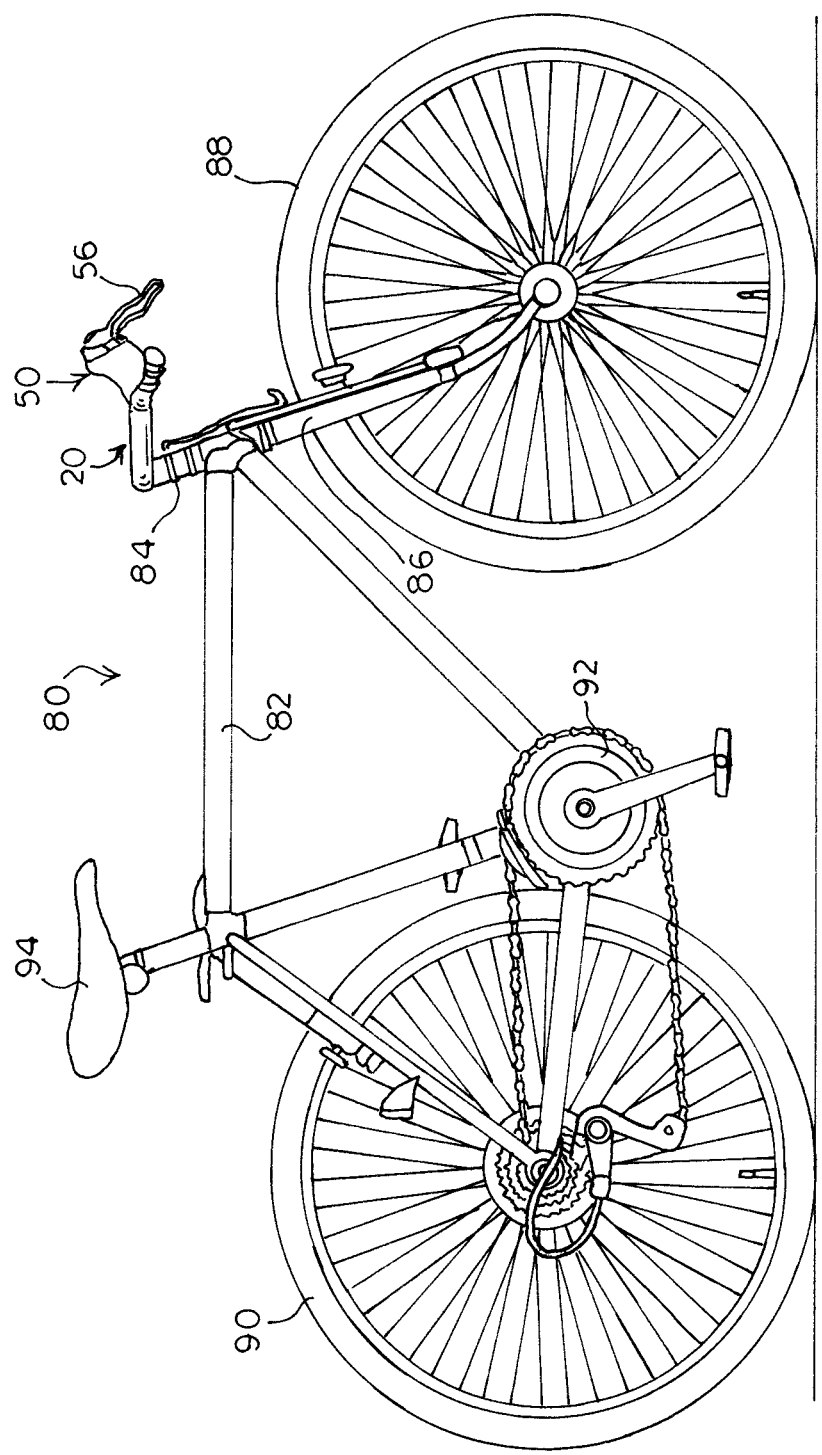
FIG. 9 is a side elevation view of a bicycle including the handlebar as shown in FIG. 1.

The handlebar is adaptable to any type of bicycle that uses brake-gear shift lever units 50. Referring to FIG. 9, a bicycle 80 is illustrated with an embodiment of the handlebar 20 described herein. The bicycle 80 comprises a frame 82, a stem 84 and front forks 86, a front wheel 88, a rear wheel 90, a drive train 92, and a seat 94. The bicycle 80 and its various components are well known in the art and will not be discussed in detail herein, except for the components that relate to the handlebar 20. It is understood that various conventional bicycle parts, such as brakes, drive trains, etc., can be used in conjunction with the handlebars.

In use, the intermediate section 30 of the transverse connecting portion 22 is fixedly coupled to the stem 84 of a bicycle 80 by a stem clamp (not shown) in a conventional manner, such that the transverse connecting portion 22 extends substantially horizontally when the bicycle is upright. It is understood that the stem 84 may be raised or lowered relative to a head tube of the bicycle. Because the stem 84 is fixedly coupled to a front fork 86 of a bicycle 80, the handlebar 20 is utilized to steer the front wheel 88 via the front fork 86 in a conventional manner.

The bicycle handlebar is represented with a right half in FIGS. 10 and 11. The left half of the handlebar 20 (not shown) is designed symmetrically to the right half relative to a center plane (not shown) bisecting the transverse connecting portion 22. Thus, since they are mirror images of each other, only an outer portion of the right half of the handlebar 20 will be described in detail herein. However, it is understood that the description of the right portion also applies to the left portion since these parts are substantially identical.

The handlebar 20 is configured so that at least three gripping sections are provided for a variety of different hand positions for the rider. Moreover, the hand positions are available in different riding postures, including an upright posture, a tucked or aerodynamically favorable sprinting posture, and an out-of-the-saddle posture, as well as various other riding positions. Referring to FIG. 10, the lower handlebar portions 26 can be grasped by a rider along with the grip handle brackets 52 when the rider is upright, whether in the saddle or out of the saddle. In this posture, the forearms are not directed in the running direction of the bicycle, but rather the forearms extend substantially upwardly. In the tucked posture (FIG. 11), the rider naturally assumes a position in which the forearms are supported by the transverse connecting portion 22 and the upper handlebar portions 24 while the hands engage the grip handle brackets 52 and lower handlebar portions 26. Forearm rests (not shown), or other padding material, may be mounted to the handlebar 20 and positioned to increase comfort of the rider when in the tucked position. In all riding postures, the rider has direct access to the brake-gear shift levers while the wrist is in a comfortable, natural position. Thus, the brake-gear shift levers can be conveniently operated when the rider assumes any of the different riding postures.

In another embodiment, the handlebar 20 may be rotated about the longitudinal axis 32 of the transverse connecting portion 22 when connected to the stem 84 such that the common plane through the transverse connecting portion 22 and the upper handlebar portions 24 is angled upwardly from the bicycle stem relative to the horizontal. This upward tilt provides for a more upright riding posture, which many casual riders may find more comfortable. Moreover, it is understood that variations in the length, radii of curvature, and relative angles of the handlebar 20 described herein can be manufactured to suit individual riders' preferences.

In yet another embodiment, the lower handlebar portions 26 may be adjustably attached to the handlebar 20 and independently moved to a desired location relative to the position of the upper handlebar portions 24. The lower handlebar portions 26 may then be fixed, for example by a screw (not shown), and the rider can maintain that position until a change is desired. The change is brought about by merely loosening the screw and moving the lower handlebar portions 26 to the desired location relative to the position of the upper handlebar portions 24 and then re-tightening the screw. By the use of an adjustable connection mating the upper handlebar portions 24 and the lower handlebar portions 26, the lower handlebar portions 26 can be moved about multiple axes in order to provide multiple adjustable positions as desired by the rider.

Figure 12:
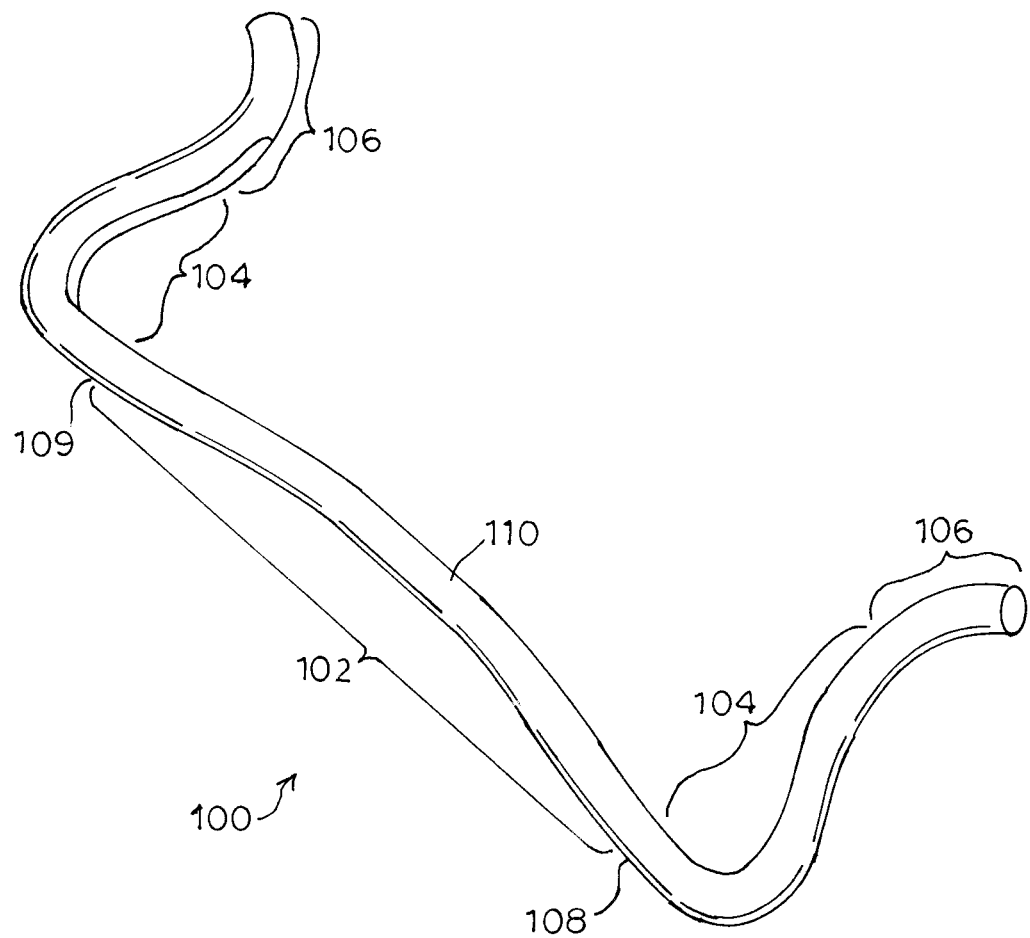
FIG. 12 is a top perspective view of another embodiment of a handlebar for use with a bicycle.
Figure 13:
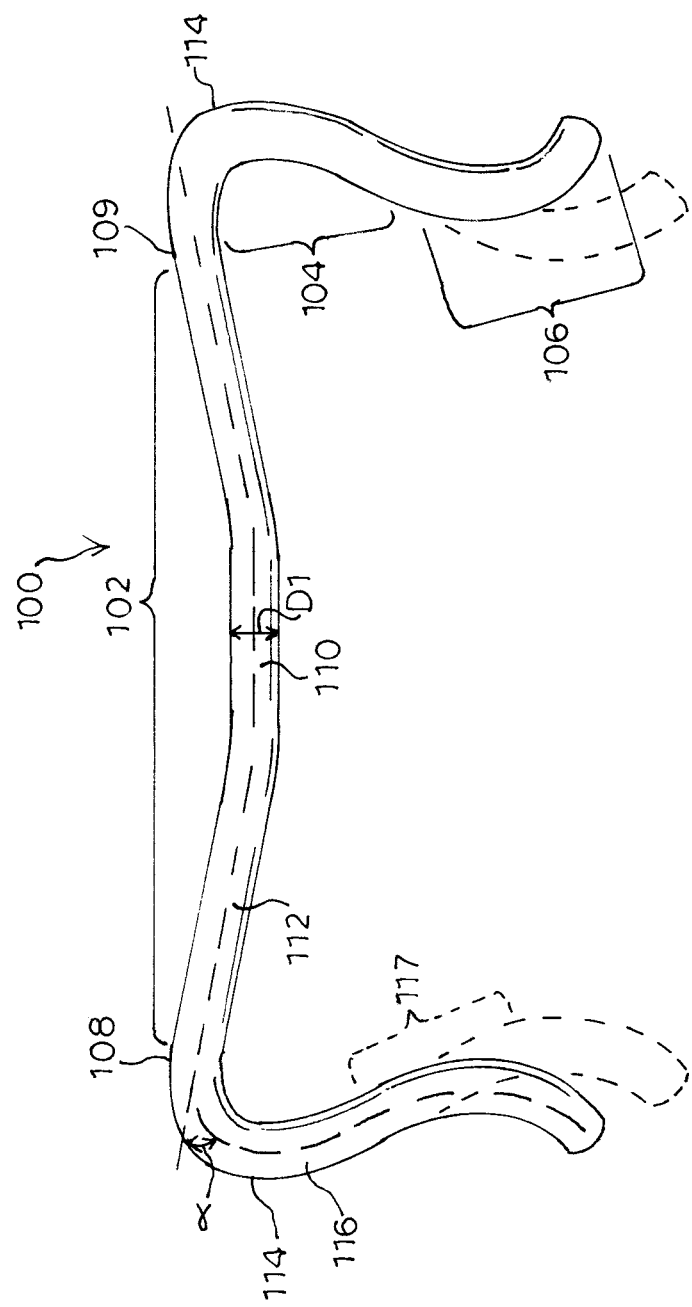
FIG. 13 is a top plan view of the handlebar as shown in FIG. 12.

Referring now to FIG. 12, another embodiment of a handlebar for use with a bicycle is shown and generally designated at 100. The handlebar 100 comprises a transverse connecting portion 102, a pair of first upper handlebar portions 104, and a pair of second lower handlebar portions 106. The transverse connecting portion 102 is an elongated member having first and second ends 108, 109, a short intermediate mounting section 110 and a central longitudinal axis 112 (FIG. 13). The portions of the transverse connecting portion 102 extend substantially transversely from each side of the intermediate section 110 such that the overall length of the handlebar from the outermost edge of each of the upper handlebar portions is about 18 inches to about 22 inches, although it is understood this distance may vary to accommodate the size of the rider. As best shown in FIG. 13, the portions of the transverse connecting portion 102 extending from each side of the intermediate section 110 are directed rearwardly. The rearward distance, or the "reverse offset", in the plane of the central longitudinal axis 112 of the transverse connecting portion 102 from the midpoint of the transverse connecting portion 102 to an imaginary line joining the ends of the central longitudinal axis 112 is about 15 mm to about 25 mm.

The transverse connecting portion 102 preferably has an aerodynamic cross-sectional shape. In one embodiment, the transverse connecting portion 102 is circular in transverse cross-section, and a central section of the transverse connecting portion has the clamp diameter D1 (FIG. 12). The remainder of the transverse connecting portion 22 and the upper handlebar portions 24 and the lower handlebar portions 26 may be substantially formed with the diameter D1 or the slightly smaller diameter, D2. The transverse connecting portion 102 forms a first continuous gripping surface for the hands on each side of the intermediate section 110.

Each of the pair of first upper handlebar portions 104 is coupled to an end 108, 109 of the transverse connecting portion 102. As best seen in FIGS. 12 and 13, the upper handlebar portions 104 extend outwardly from the ends 108, 109 of the transverse connecting portion 102. In one embodiment, the upper handlebar portions 104 comprise a curved section 114 bending forwardly and inwardly relative to the transverse connecting portion 102. In another embodiment, shown in phantom in FIG. 13, the curved section 114 is followed by a straight section 117. The curved section 114 of each upper handlebar portion 104 has a radius of curvature R1 of about one to about two inches. Each upper handlebar portion 104 has a central longitudinal axis 116 in the same plane as the central longitudinal axis 112 of the transverse connecting portion 102. The longitudinal axes 116 at the inner end of the upper handlebar portions 104 extend tangentially to the longitudinal axis 112 of the transverse connecting portion 102. The central longitudinal axes 116 of the upper handlebar portions 104 are angled inwardly relative to the central longitudinal axis 112 of the transverse connecting portion 102. The inward angle ($\alpha$) may be from about 45 degrees to about 90 degrees. In one embodiment, the inward angle ($\alpha$) may be about 60 degrees. The overall length of the upper handlebar portions 104 is variable, particularly with respect to the length of the straight section 114. In one embodiment, the distance in the plane of the central longitudinal axes 112, 116 of the transverse connecting portion 102 and the pair of first upper handlebar portions 104 from the ends 108, 109 of the transverse connecting portion 102 to the forwardmost end of the lower handlebar portions 106 is about 10 mm to about 15 mm. Preferably, the upper handlebar portions 104 have an overall length sufficient to provide a second gripping surface for the hands. The second gripping surface may be used to accommodate the hands in an upright standard riding position or extended further to provide a tucked aero-position, as will be described below. Each of the pair of second lower handlebar portions 106 adjoins an end of the first upper handlebar portions 104 in a continuing manner, as described hereinabove.

Although the present invention has been shown and described in considerable detail with respect to a few exemplary embodiments thereof, it should be understood by those skilled in the art that I do not intend to limit the invention to the embodiments since various modifications, omissions and additions may be made to the disclosed embodiments without materially departing from the novel teachings and advantages of the invention, particularly in light of the foregoing teachings. Accordingly, I intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

I claim:

1. A handlebar for a bicycle including a stem operatively connected to a front wheel for steering the bicycle, the handlebar comprising:

a transverse extension piece adapted to be connected to the stem of the bicycle at a midpoint of the transverse extension piece, the transverse extension piece having a longitudinal axis and a transverse axis symmetrically bisecting the transverse extension piece through the midpoint and perpendicular to the longitudinal axis, the transverse extension piece comprising a first portion and a second portion disposed symmetrically on respective opposite sides of the midpoint, each of the first portion and the second portion of the transverse extension piece extending rearwardly from a point along the longitudinal axis of the transverse extension piece spaced from the transverse axis; and first and second handlebar segments disposed symmetrically on respective opposite ends of the transverse extension piece, each of the handlebar segments comprising
a first handlebar segment portion having a central axis extending in a plane with the longitudinal axis of the transverse extension piece, the first handlebar segment portion including
a first curved section adjoining one end of the transverse extension piece and extending forwardly and inwardly from the transverse extension piece in a direction toward the transverse axis, and
a second straight section extending forwardly from the end of the curved section, and
a second handlebar segment portion having a central axis, the second handlebar segment portion including a curved section adjoining the end of the second straight section of the first handlebar segment portion and extending forwardly outwardly in a direction away from the transverse axis and then forwardly downwardly with respect to the plane, wherein the second handlebar segment portion is the terminal end of the handlebar, and wherein the transverse extension piece and the first and second handlebar segment portions define a plurality of gripping positions for a rider in combination with a plurality of rider positions.

2. The handlebar as recited in claim 1, wherein the handlebar is formed from a single continuous piece of tubing.

3. The handlebar as recited in claim 1, wherein the plane is horizontal.

4. The handlebar as recited in claim 1, wherein the plane is not horizontal.

5. The handlebar as recited in claim 1, wherein the first curved section of the first handlebar segment portion extends inwardly such that the central axis of the first handlebar segment portion tangentially intersects the longitudinal axis of the transverse extension piece at an angle relative to the longitudinal axis of the transverse extension piece, the angle being determined by the curvature of the first curved section.

6. The handlebar as recited in claim 5, wherein the radius of curvature of the first curved section of the first handlebar segment portion is about one inch.

7. The handlebar as recited in claim 5, wherein the angle is about 45 degrees to about 90 degrees.

8. The bicycle handlebar as recited in claim 1, wherein the second straight section has a length sufficient for supporting a forearm of the rider.

9. The handlebar as recited in claim 1, wherein the curved end portion of the second handlebar segment portion extends outwardly such that the central axis of the second handlebar segment portion tangentially intersects the central axis of the first handlebar segment portion at an angle relative to the central axis of the first handlebar segment portion, the angle being determined by the curvature of the curved end portion.

10. The handlebar as recited in claim 9, wherein the outwardly extending radius of curvature of the curved end portion of the second handlebar segment portion is about two inches.

11. The handlebar as recited in claim 9, wherein the angle is about 10 degrees to about 40 degrees.

12. The handlebar as recited in claim 1, wherein the curved end portion of the second handlebar segment portion extends downwardly with respect to the plane such that the central axis of the second handlebar segment portion tangentially intersects the central axis of the first handlebar segment portion at an angle relative to the central axis of the first handlebar segment portion.

13. The handlebar as recited in claim 12, wherein the angle is about 0 degrees to about 45 degrees.

14. The bicycle handlebar as recited in claim 1, further comprising a braking lever support element connected to the second handlebar segment portion.

15. The bicycle handlebar as recited in claim 14, wherein the braking lever support element has a longitudinal axis in a second plane including the central axis of the second handlebar segment portion.

16. The bicycle handlebar as recited in claim 15, wherein the braking lever support element has a free end extending upwardly and inwardly with respect to the transverse axis such that the longitudinal axis of the brake lever support element defines an angle relative to the plane.

17. The handlebar as recited in claim 16, wherein the angle is about 0 degrees to about 45 degrees.

18. The bicycle handlebar as recited in claim 15, further comprising a brake lever pivotally connected at one end to the brake lever support element for movement about a pivot axis in a plane including the longitudinal axis of brake lever support element.

19. The bicycle handlebar as recited in claim 1, wherein each of the first portion and the second portion of the transverse extension piece extends rearwardly in the plane.

20. The handlebar as recited in claim 1, wherein the rearward distance measured in the plane along the transverse axis between the midpoint of the transverse extension piece and an axis connecting the ends of the longitudinal axis of the transverse extension piece is about 15 mm to about 25 mm.

21. The handlebar as recited in claim 1, wherein the forward distance measured in the plane along an axis parallel to the transverse axis between the ends of the longitudinal axis of the transverse extension piece and the outer ends of the lower handlebar grip portions is about 10 mm to about 15 mm.

22. A bicycle, comprising:
a frame;
a rear wheel rotatably mounted to the frame;
a seat connected to the frame;
a stem journaled to the frame forward of the seat;
a fork connected to the stem;
a front wheel rotatably mounted to the fork;
a handlebar comprising
a transverse extension piece connected to the stem of the bicycle at a midpoint of the transverse extension piece, the transverse extension piece having a central longitudinal axis and a transverse axis symmetrically bisecting the transverse extension piece through the midpoint and perpendicular to the longitudinal axis, the transverse extension piece comprising a first portion and a second portion disposed symmetrically on respective opposite sides of the midpoint, each of the first portion and the second portion of the transverse extension piece extending rearwardly from a point along the longitudinal axis of the transverse extension piece spaced from the transverse axis; and
first and second handlebar segments disposed symmetrically on respective opposite ends of the transverse extension piece, each of the handlebar segments comprising a first handlebar segment portion having a central axis extending in a plane with the longitudinal axis of the transverse extension piece, the first handlebar segment portion including
- a first curved section adjoining one end of the transverse extension piece and extending forwardly and inwardly from the transverse extension piece in a direction toward the transverse axis, and
- a second straight section extending forwardly from the end of the curved section, and a second handlebar segment portion having a central axis, the second handlebar segment portion including a curved section adjoining the end of the second straight section of the first handlebar segment portion and extending forwardly outwardly in a direction away from the transverse axis and then forwardly downwardly with respect to the plane, wherein the second handlebar segment portion is a terminal end of the handlebar, and wherein the transverse extension piece and the first and second handlebar segment portions define a plurality of gripping positions for a rider in combination with a plurality of rider positions.

23. The bicycle as recited in claim 22, wherein each of the first portion and the second portion of the transverse extension piece extends rearwardly in the plane.

* * * * *

UNITED STATES PATENT AND TRADEMARK OFFICE
CERTIFICATE OF CORRECTION

| | | |
|---|---|---|
| PATENT NO. | : 9,010,788 B2 | Page 1 of 1 |
| APPLICATION NO. | : 13/623427 | |
| DATED | : April 21, 2015 | |
| INVENTOR(S) | : John Toffaletti | |

It is certified that error appears in the above-identified patent and that said Letters Patent is hereby corrected as shown below:

On the title page of the patent, please change item (63) to:

Continuation-in-part of application No. 13/236,756 filed on Sep. 20, 2011.

Signed and Sealed this
Twentieth Day of October, 2015

Michelle K. Lee
*Director of the United States Patent and Trademark Office*